US011184433B2

(12) United States Patent
Padiyar et al.

(10) Patent No.: US 11,184,433 B2
(45) Date of Patent: Nov. 23, 2021

(54) CONTAINER MOBILITY BASED ON BORDER GATEWAY PROTOCOL PREFIXES

(71) Applicant: Microsoft Technology Licensing, LLC, Redmond, WA (US)

(72) Inventors: Vinayak Uppunda Padiyar, Bellevue, WA (US); Shivesh Kumar, Bellevue, WA (US); Saravanan Ramasamy Subramanian, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/836,680

(22) Filed: Mar. 31, 2020

(65) Prior Publication Data

US 2021/0306412 A1    Sep. 30, 2021

(51) Int. Cl.
*H04L 29/08*    (2006.01)
(52) U.S. Cl.
CPC ...... *H04L 67/1021* (2013.01); *H04L 67/1029* (2013.01)
(58) Field of Classification Search
CPC ....... H04L 41/00; H04L 41/04; H04L 41/042; H04L 41/50–5019; H04L 41/5025; H04L 45/00; H04L 45/70–72; H04L 67/00; H04L 67/04; H04L 67/10–1004; H04L 67/1012; H04L 67/1014; H04L 67/1021; H04L 67/1025; H04L 67/1029; H04L 67/18
See application file for complete search history.

(56) References Cited

U.S. PATENT DOCUMENTS

| 10,523,592 | B2 * | 12/2019 | Byers | H04L 47/823 |
| 2005/0232189 | A1 * | 10/2005 | Loushine | H04W 64/00 370/328 |
| 2010/0322255 | A1 | 12/2010 | Hao et al. | |

(Continued)

FOREIGN PATENT DOCUMENTS

EP    2976868 A1    1/2016

OTHER PUBLICATIONS

MAC Address—definition by IONOS (Year: 2019).*
(Continued)

*Primary Examiner* — Boris D Grijalva Lobos
(74) *Attorney, Agent, or Firm* — Ray Quinney & Nebeker, P.C.; Adam K. Richards; Henry Gabryjelski

(57) ABSTRACT

The disclosure describes systems and methods for minimizing latency for users accessing services hosted on a cloud-computing system. A service of the cloud-computing system periodically queries edge sites of the cloud-computing system for information regarding containers stored on the edge sites. In response to the queries, the edge sites provide information identifying containers hosted on the edge sites, prefixes that the containers service, and connection locations where traffic from the prefixes enter the cloud-computing system. The service may determine whether the connection locations have changed. If a connection location for a prefix has changed, the service modifies a location of a container servicing the prefix. The service may migrate the container to a current connection location for the prefix. Modifying the location may reduce latency experienced by users behind the prefix.

11 Claims, 8 Drawing Sheets

(56) References Cited

U.S. PATENT DOCUMENTS

| | | | |
|---|---|---|---|
| 2013/0246588 A1* | 9/2013 | Borowicz | H04L 41/08 709/220 |
| 2013/0339519 A1 | 12/2013 | Lientz | |
| 2014/0258533 A1* | 9/2014 | Antony | G06F 9/45558 709/226 |
| 2015/0172183 A1* | 6/2015 | DeCusatis | H04L 45/74 370/392 |
| 2019/0253274 A1* | 8/2019 | Van Dussen | H04L 43/12 |
| 2020/0089526 A1 | 3/2020 | Enguehard et al. | |

OTHER PUBLICATIONS

Deshpande, et al., "Edge Computing Embedded Platform with Container Migration", In Proceedings of IEEE SmartWorld, Ubiquitous Intelligence & Computing, Advanced & Trusted Computed, Scalable Computing & Communications, Cloud & Big Data Computing, Internet of People and Smart City Innovation, Aug. 4, 2017, 6 Pages.

Holt, et al., "Routing Preference and Peering Service", Application as Filed in U.S. Appl. No. 62/929,749, filed Nov. 1, 2019, 57 Pages.

Ma, et al., "Efficient Live Migration of Edge Services Leveraging Container Layered Storage", In Journal of IEEE Transactions on Mobile Computing, vol. 18, Issue 9, Sep. 1, 2019, pp. 2020-2033.

Ma, et al., "Efficient Service Handoff Across Edge Servers via Docker Container Migration", In Proceedings of the Second ACM/IEEE Symposium on Edge Computing, Oct. 12, 2017, 13 Pages.

Ross, et al., "Optimize ExpressRoute Routing", Retrieved from: https://docs.microsoft.com/en-us/azure/expressroute/expressroute-optimize-routing, Nov. 7, 2019, 8 Pages.

Schlinker, et al., "Engineering Egress with Edge Fabric", In Proceedings of the Conference of the ACM Special Interest Group on Data Communication, Aug. 21, 2017, 14 Pages.

Wu, et al., "Finding a Needle in a Haystack: Pinpointing Significant BGP Routing Changes in an IP Network", In Proceedings of the 2nd Symposium on Networked Systems Design & Implementation, vol. 2, May 2005, 14 Pages.

"International Search Report and Written Opinion Issued in PCT Application No. PCT/US21/017153", dated May 4, 2021, 13 Pages.

* cited by examiner

CONTAINER MOBILITY BASED ON BORDER GATEWAY PROTOCOL PREFIXES

CROSS-REFERENCE TO RELATED APPLICATIONS

N/A

BACKGROUND

A cloud-computing system may refer to a collection of computing devices or resources that can be accessed remotely. Stated another way, cloud computing may be described as the delivery of computing services (such as storage, databases, networking, software, applications, processing, or analytics) over the Internet. Clients may access a cloud-computing system through a client device. The cloud-computing system may include resources that provide services to clients. These resources may include processors, memory, storage, and networking hardware.

A cloud-computing system may include a number of data centers that may be located in different geographic locations. Each data center may include many servers. A server may be a physical computer system. The cloud-computing system may run virtual machines on a server. A virtual machine may be a program that emulates a distinct computer system but that can run on a server with other virtual machines. Like a physical computer, a virtual machine may include an operating system and applications.

Data centers may be located far away from large population centers and from clients who access the cloud-computing system. The distance between the client and the data center may cause a client to experience latency in accessing the cloud-computing system.

SUMMARY

In accordance with one aspect of the present disclosure, a method is disclosed for reducing latency in providing services from a cloud-computing system. The method includes detecting, at a first time, that traffic serviced by a container enters the cloud-computing system at a first location. The container is located at the first location. The method also includes detecting, at a second time, that the traffic enters the cloud-computing system at a second location different from the first location. The method also includes migrating, in response to detecting that the traffic enters the cloud-computing system at the second location, the container to the second location.

The container may provide dynamic content to a user.

Migrating the container may include migrating state information associated with the dynamic content and the user.

Migrating the container to the second location may reduce latency experienced by the user.

Detecting, at the first time, that the traffic enters the cloud-computing system at the first location may include querying the first location and receiving, from the first location, information indicating that the first location receives the traffic.

The first location may be an edge site of the cloud-computing system.

Detecting, at the second time, that the traffic enters the cloud-computing system at the second location may include querying the first location, querying the second location, and receiving from the second location information indicating that the second location receives the traffic.

The second location may be an edge site of the cloud-computing system.

The method may further include associating, at the first time, the first location with a source of the traffic and the container in a record and storing the record.

In accordance with another aspect of the present disclosure, a method is disclosed that includes determining, at a first time, a first prefix-connection location of a prefix. The first prefix-connection location is where traffic from the prefix enters a cloud-computing system at the first time. The method further includes determining, at a second time, a second prefix-connection location of the prefix. The second prefix-connection location is where traffic from the prefix enters the cloud-computing system at the second time. The method further includes comparing the second prefix-connection location with the first prefix-connection location. The method further includes determining whether to move a container that services the prefix based on the comparison.

The container may be hosted at the first prefix-connection location.

The method may further include determining that the second prefix-connection location is different from the first prefix-connection location.

The method may further include determining to move the container based on the second prefix-connection location being different from the first prefix-connection location and migrating the container from the first prefix-connection location to the second prefix-connection location.

The method may further include determining that the second prefix-connection location is identical to the first prefix-connection location.

The method may further include determining to not move the container based on the second prefix-connection location being identical to the first prefix-connection location and maintaining the container at the first prefix-connection location.

The method may further include associating, at a first time, the prefix, the first prefix-connection location, and a globally unique identifier of the container in a record. The method may further include storing the record.

The first prefix-connection location and the second prefix-connection location may be edge sites of the cloud-computing system.

The cloud-computing system may include a data center and the first prefix-connection location and the second prefix-connection location may not be included in the data center.

In accordance with another aspect of the present disclosure, a method is disclosed that includes sending, from a user device, a first message to a cloud-computing system. The first message enters the cloud-computing system at a first location and the first location hosts a container servicing the user device. The method further includes sending, from the user device, a second message to the cloud-computing system. The second message enters the cloud-computing system at a second location different from the first location and the first location hosts the container. The method further includes sending, from the user device, a third message to the cloud-computing system. The third message enters the cloud-computing system at the second location and the second location hosts the container.

The second message may take longer to reach the first location than the third message takes to reach the second location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
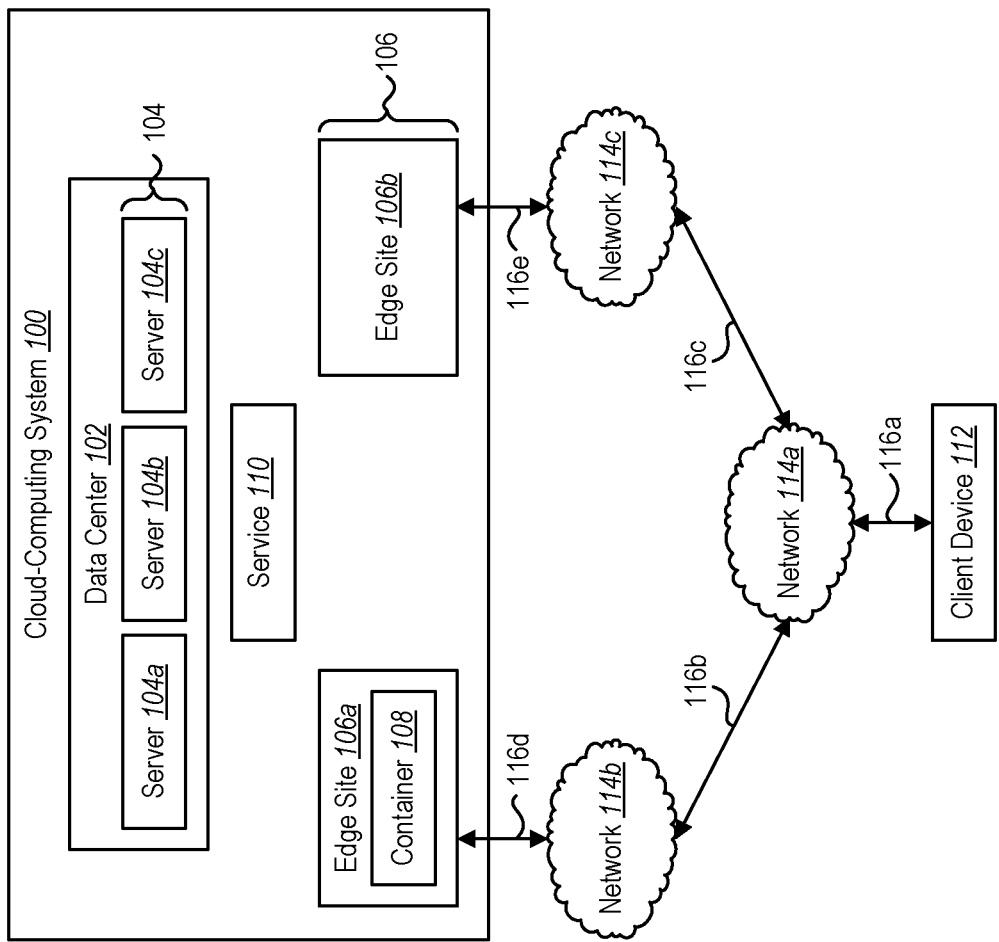
FIG. 1 illustrates an example cloud-computing system for minimizing latency experienced by client devices accessing services of the cloud-computing system.

This disclosure concerns systems and methods for reducing latency in accessing dynamic content hosted on a cloud-computing system. Hosting dynamic content at an edge of the cloud-computing system may offer better latency profiles for compute-intensive and latency-sensitive workloads. In other words, the closer a container is to the user, the better the user experience is. But keeping a container close to the user is a challenge because the route traffic from the user travels to reach the cloud-computing system may change. The systems and methods of this disclosure place dynamic content in containers hosted on edge sites of the cloud-computing system and automatically relocate the containers based on where network traffic from a client device enters the cloud-computing system.

A cloud-computing system may refer to a collection of computing devices or resources that can be accessed remotely. The cloud-computing system may provide computing services over the Internet to clients. The cloud-computing system may host content provided by a third-party content provider and give customers of the content provider access to the content. The cloud-computing system may include a number of data centers located in different geographic locations. Each data center may include multiple servers. A server may be a physical computer system. The server may include multiple virtual containers (such as virtual machines). Each virtual container may provide services to a client. In this way, a single server may provide services to multiple clients. A virtual container may provide a client access to content (such as a game) of a third-party content provider.

Data centers may be located far away from large population centers and from clients who access the cloud-computing system. Data centers may be large real-estate complexes that require significant amounts of power to operate. Land may be more available and less expensive in less populated areas. Similarly, power may be cheaper and easier to access in less populated areas. The distance between the client and the data center may cause a client to experience latency in accessing the cloud-computing system and services hosted on the cloud-computing system.

Clients who want to access cloud-computing services generally rely on one or more networks external to the cloud-computing system. The one or more networks may include an internet service provider (ISP). It is unlikely that an ISP has, or that additional networks connecting the ISP to the cloud-computing system have, a large bandwidth to carry traffic to a data center located in a rural and potentially remote area. The limited bandwidth available for carrying traffic from a client device to a rural data center may result in a client experiencing latency in accessing the cloud-computing system and receiving services from the cloud-computing system.

To help reduce latency a cloud-computing system may include edge sites. The edge sites may be part of the cloud-computing system and be connected to the data center through the cloud-computing system's internal network and backbone. The edge sites may, however, be located closer to where large groups of clients reside, such as in population centers and large cities. The edge sites may be able to receive communications from networks external to the cloud-computing system. The edge sites may be much smaller in physical size than data centers. The edge sites may also have much smaller capacity and fewer computing resources than data centers. As a result, the edge sites may be limited to hosting frequently accessed content and services. But because edge sites may be located close to clients, hosting cloud-computing services on an edge site may reduce the latency a client experiences. Communications between the client and an edge site may have to travel a shorter distance than communications between the client and a data center. Moreover, an ISP may have more bandwidth available for carrying traffic between a client and a nearby edge site than for carrying traffic between a client and a distant data center.

Edge sites may also reduce latency and improve overall reliability because once information reaches an edge site, the cloud-computing system can use its own backbone and network to carry the information to a data center if necessary. The operator of a cloud-computing system may control the reliability and bandwidth of the backbone and network of the cloud-computing system but have no control over the reliability of networks external to the cloud-computing system. The operator of the cloud-computing system may have a greater incentive to maintain a reliable network than those operating networks external to the cloud-computing system.

Reducing latency may improve user experience with the cloud-computing system and content (including third-party content) hosted on the cloud-computing system. For example, consider that a cloud-computing system hosts a software application (like a game) for a third-party content provider. Assume a user accesses the game using a smart phone. High latency may cause the game to constantly pause to load content. Or it may result in noticeable delays between performing actions on the smart phone and the actions registering on the screen. Reducing the latency may reduce or eliminate those delays, resulting in a much smoother game-playing experience for the user.

Improving user experience with third-party content hosted on the cloud-computing system may benefit the cloud-computing system operator. Third-party content providers may pay to host their content on the cloud-computing system. And the amount the third-party content provider pays may be based (at least in part) on the total demand for the content provider's content. When users have a good experience using the third-party content provider's content on the cloud-computing system, demand for the content provider's content may increase. The increased demand may cause the content provider to pay more money to the cloud-computing system operator. Positive user experience with the content provider's content may also cause additional content providers to host their content on the cloud-computing system. Thus, reducing latency may increase revenues of the cloud-computing system.

In addition to reducing latency, a cloud-computing system may attract content providers (which may also be referred to as service providers) by providing serverless computing. A cloud-computing system may provide a physical server to a third-party service provider for hosting the third-party's services. But because of the challenges with managing a physical host, the cloud-computing system may also allow the service provider to provide content using a virtual machine. A virtual machine may be a program that emulates a distinct computer system but that can run on a server with other virtual machines. Like a physical computer, a virtual machine may include an operating system and applications. Thus, managing the virtual machine is less complex than managing a server. And using virtual machines (rather than entire servers) gives the service provider greater flexibility in choosing the amount of computing resources that it needs. But the service provider must still manage the virtual machine (such as scaling the virtual machine as demand increases). An even more flexible and less burdensome option (at least from the service provider's perspective) is serverless computing. With serverless computing, the service provider provides a cloud-computing system with small functions that together provide the service provider's services. The cloud-computing system then deploys the services in a sandbox environment. The sandbox environment may host containers, which provide the service provider's services to customers. All the service provider does is provide code. The operator of the cloud-computing system manages scaling and updating.

A cloud-computing system may improve customer and service provider experience with the cloud-computing system by hosting serverless computing containers on edge sites close to a user and dynamically migrating those containers in response to changes in where external traffic enters the cloud-computing system. Doing so may reduce latency experienced by users of services hosted on a cloud-computing system.

A service provider may provide content or code to a cloud-computing system operator. The operator may deploy the code in a container hosted at a data center. But because the data center may not be close to a user of the container, the cloud-computing system may automatically move the container to minimize latency experienced by the user. For example, the cloud-computing system may automatically move the container to a location within the cloud-computing system that is closer to the user than the data center, such as an edge site near the user. The edge site may be where the user connects to the cloud-computing system. Or the edge site may be near where the user connects to the cloud-computing system if where the user connects to the cloud-computing system lacks capacity for the container. In the alternative to deploying the container first at the data center and then migrating the container, the cloud-computing system may automatically deploy the container in the first instance near the user. In this context, a distance may be measured in terms of a physical distance or in terms of a distance a signal must travel from one point to another.

At some future point, the location (such as the edge site) hosting the container may no longer be where traffic from the user enters the cloud-computing system. For example, the user may use an ISP to connect to the internet. The ISP may route traffic from the user to a second network, which then sends the traffic to a first edge site close to the user. The first edge site may host a container that provides services to the user. But the second network may become unavailable due to maintenance, failure, cost, or other reasons. At that point, the ISP may route traffic to a third network, which then sends the traffic to a second edge site farther from the user than the first edge site. The user's traffic now enters the cloud-computing system at the second edge site, but the container that services the user is still at the first edge site. In that situation, traffic from the user may have to travel through the cloud-computing system from the second edge site to the first edge site. This pathway may be long (and much longer than the pathway from the user to the second edge site) and result in a significant increase in latency experienced by the user. The user, of course, will not understand the cause of the latency increase and may blame the service provider or the cloud-computing system.

To improve user experience the cloud-computing system may include a service that automatically works to minimize latency based on changes in network routing. The service may automatically detect that the user's traffic now enters the cloud-computing system through the second edge site. In response, the service may automatically migrate the container from its current location to a new location closer to the second edge site, such as at the second edge site. Because the second edge site is the point where the user connects to the cloud-computing system, the user experiences less latency.

To detect changes in where user traffic enters the cloud-computing system the service may periodically (such as at fixed time intervals) query edge sites for information regarding containers hosted at the edge sites. For each container, the service may create a record associating the container, an external network being serviced by the container, and a connection location where traffic from the external network is entering the cloud-computing system. At the next query, the service may, for each container, compare a current connection location of the external network with the previous connection location of the external network. If the current connection location is different from the previous connection location, the service may migrate the container to the current connection location. Automatically detecting changes in where traffic enters the cloud-computing system and automatically migrating containers in response to those changes improves user experience with services hosted on the cloud-computing system. That in turn increases service-provider satisfaction and attracts more service providers to the cloud-computing system. In at least this way, the disclosed systems and methods improve cloud-computing technology.

FIG. 1 illustrates an example cloud-computing system 100 for reducing latency in accessing cloud-computing services.

The cloud-computing system 100 may include a data center 102. The data center 102 may be a large real-estate complex that includes servers 104. The servers 104 may include physical computing resources such as processors, memory, storage, and networking hardware. The data center 102 may require large amounts of power to run the servers 104. The cloud-computing system 100 may use the data center 102 to provide cloud-computing services to clients. The data center 102 may host content and services from third-party content and service providers.

The data center 102 may have a physical location. The physical location of the data center 102 may be chosen based on land availability, land prices, access to power, power prices, ambient temperature, wind conditions, etc. The physical location of the data center 102 may be far away from large population centers. For example, the data center 102 may be located in a remote, rural area.

The cloud-computing system 100 may include edge sites 106. The edge sites 106 may include physical computing resources. The edge sites 106 may receive communications from networks external to the cloud-computing system 100. The physical computing resources of the edge sites 106 may be more limited than the physical computing resources of the data center 102. The edge sites 106 may be designed to store frequently accessed content or to provide frequently requested services. For example, assume the cloud-computing system 100 stores digital copies of movies for a content provider. Assume the edge sites 106 do not have enough storage to store all the movies hosted by the cloud-computing system 100. Assume that the content provider uploads a new movie to the cloud-computing system 100 and that the content provider anticipates that the new movie will be extremely popular. The cloud-computing system 100 may place copies of the new movie on the edge sites 106.

The edge sites 106 may have physical locations different from the data center 102. The edge sites 106 may communicate with the data center 102 through a network of the cloud-computing system 100. The edge site 106a may have a first physical location and the edge site 106b may have a second physical location. The first physical location may be different from the second physical location. The first physical location and the second physical location may be different from the physical location of the data center 102. The first physical location and the second physical location may be far away from the physical location of the data center 102. The first physical location and the second physical location may be chosen to reduce a distance between clients who want to access services provided by the cloud-computing system 100 and the physical computing resources of the cloud-computing system 100 that provide the services. Having a shorter physical distance between the clients and the edge sites 106 may mean that communications from the clients can reach the edge sites 106 much faster than the communications can reach the data center 102. The first physical location and the second physical location may be in large population centers. For example, the first physical location may be in a metropolitan area (such as Los Angeles, Calif., USA), the second physical location may be in a different metropolitan area (such as San Francisco, Calif., USA), and the data center 102 may be in a rural area of West Virginia, USA. A communication from a client in San Jose, Calif., USA may be able to reach either Los Angeles or San Francisco much faster than the communication can reach West Virginia.

Placing the edge sites 106 in metropolitan areas may reduce latency experienced by clients who access the cloud-computing system 100. For example, consider a situation where a client in Los Angeles, Calif. wants to use an app on the client's phone to view a movie that is stored on the cloud-computing system 100. Assume that the data center 102 is located in West Virginia and the movie is stored on the data center 102. The large distance between the client and the data center 102 may result in the client experiencing a slow response time between clicking on the movie in the app and the movie beginning playing on the phone. The large distance may also cause pauses in the movie to allow for content buffering. But assume an alternative situation where a copy of the movie is stored on the edge site 106a, and the edge site 106a is located in Los Angeles. The shorter distance between the client and the edge site 106a may result in the client experiencing a faster response time than the client experienced when the movie was stored on the data center 102.

A client device 112 may access the cloud-computing system 100. Communications between the client device 112 and the cloud-computing system 100 may travel through one or more networks 114. The networks 114 may be internet service providers. There may be connections 116 that link the client device 112, the networks 114, and the cloud-computing system 100. The connection 116a may be a pathway through which the client device 112 and the network 114a can exchange information. The connection 116b may be a pathway through which the network 114a and the network 114b exchange information. The connection 116c may be a pathway through which the network 114a and the network 114c exchange information. The connection 116d may be a pathway through which the network 114b and the cloud-computing system 100 exchange information. To exchange information with the cloud-computing system 100 the network 114b may exchange information with the edge site 106a. The connection 116e may be a pathway through which the network 114c and the cloud-computing system 100 exchange information. To exchange information with the cloud-computing system 100 the network 114c may exchange information with the edge site 106b. It may be that the network 114a does not have a connection through which it can exchange information directly with the cloud-computing system 100.

There may be more than one pathway through which information can travel from the client device 112 to the cloud-computing system 100. A first pathway may be the following: (a) the client device 112 sends data to the network 114a using the connection 116a; (b) the network 114a sends the data to the network 114b using the connection 116b; and (c) the network 114b sends the data to the edge site 106a using the connection 116d. A second pathway may be the following: (a) the client device 112 sends data to the network 114a using the connection 116a; (b) the network 114a sends the data to the network 114c using the connection 116c; and (c) the network 114c sends the data to the edge site 106b using the connection 116e.

One of the first pathway or the second pathway may be a primary pathway and the other may be a secondary pathway. The network 114a may send data to the cloud-computing system 100 using the primary pathway unless the primary pathway is not available. When the primary pathway is not available, the network 114a may send the data to the cloud-computing system 100 using the secondary pathway. A pathway may become unavailable if one or more connections or networks on the pathway become unavailable. A connection or network may become unavailable due to a hardware failure, due to the network or the connection refusing to carry traffic for the cloud-computing system 100, or due to other reasons. For example, assume the primary pathway is the first pathway described above. Assume, however, that the network 114b fails or goes down for maintenance. In that instance, the client device 112 and the cloud-computing system 100 may use the second pathway described above to communicate.

The primary pathway for transmitting data between the cloud-computing system 100 and the client device 112 may change. For example, the first pathway may initially be set as the primary pathway, and the cloud-computing system 100 and the client device 112 may initially exchange information using the first pathway. At a later time, the second pathway may become the primary pathway. At that time, the cloud-computing system 100 and the client device 112 may exchange information using the second pathway unless it becomes unavailable. The primary pathway may change for a variety of reasons. For example, assume the first pathway described above is initially the primary pathway. But assume the network 114b increases prices for carrying traffic to the cloud-computing system 100. That may result in the second pathway described above becoming the primary pathway. In that situation, even though the first pathway is still available, the cloud-computing system 100 and the client device 112 may stop using the first pathway and begin using the second pathway to communicate.

The network 114a may advertise one or more border gateway protocol (BGP) prefixes, which may be referred to as "prefixes." A prefix may be a string of characters that indicates a source of network traffic. A prefix may represent a collection of Internet Protocol (IP) addresses. One or more users may be behind a prefix. A prefix may indicate to the cloud-computing system 100 a network location for sending return communications. The network 114a may advertise a prefix that includes the client device 112. The cloud-computing system 100 may receive the prefix when the cloud-computing system receives communications from the network 114a that originate from the prefix. The network 114a may advertise more than one prefix.

The edge sites 106 may include containers, such as container 108. Although FIG. 1 shows only the container 108, the edge site 106a and the edge site 106b may contain multiple containers. The data center 102 may also include containers.

The container 108 may be hosted in a compute sandbox deployed on the edge site 106a. The container 108 may enable serverless computing. The compute sandbox may host multiple containers. The container 108 may provide access to computing resources, applications, content, or services. The content provided by the container 108 may be static or dynamic. When the content is dynamic content, the container 108 may maintain information about one or more states of the dynamic content. The container 108 may have a globally unique identifier (GUI) that uniquely identifies the container 108 as compared to all other containers operating within the cloud-computing system 100. The container 108 may provide services to a particular client or client device. The container 108 may be limited to providing services to the particular client or client device. The container 108 may have a container location. The container location may be a location within the cloud-computing system 100 where the container 108 is hosted. For example, the container location of the container 108 may be the edge site 106a.

The container 108 may be associated with a prefix. Being associated with a prefix may mean the container 108 provides services to a user accessing the cloud-computing system 100 from the prefix. The container 108 may be associated with only a single prefix. The single prefix may, however, have multiple associated containers. Traffic from the prefix associated with the container 108 may enter the cloud-computing system 100. The traffic may enter the cloud-computing system 100 through an edge site, such as the edge site 106a or the edge site 106b. Traffic from the prefix associated with the container 108 may enter the cloud-computing system 100 at an edge site where the container 108 is hosted or at a different edge site. Traffic from the prefix associated with the container 108 may also enter the cloud-computing system 100 at the data center 102.

The cloud-computing system 100 may include a service 110. The service 110 may obtain BGP routes from all the edge sites 106. The BGP routes may indicate a path (such as networks and connections) that data entering the cloud-computing system 100 has taken to reach the cloud-computing system 100. The BGP routes may include prefixes. A network being used by client devices to access the internet may advertise one or more prefixes to the cloud-computing system 100. The cloud-computing system 100 may use the prefix to send data back to the network and the client devices.

The service 110 may periodically obtain and store information regarding network traffic at the edge sites 106. The service 110 may query one or more of the edge sites 106a, 106b of the cloud-computing system 100 for information regarding prefixes that are entering the cloud-computing system 100. The service 110 may store information regarding prefixes that are entering the cloud-computing system 100. The service 110 may also obtain and store information regarding any containers that support the prefixes that are entering the cloud-computing system 100. The service 110 may associate the edge site where a prefix is entering the cloud-computing system 100, the prefix, and the containers that support the prefix in a record and store the record. For example, assume a first prefix accesses the cloud-computing system 100 at the edge site 106a. Also assume the container 108 provides services to the first prefix. The service 110 may associate, in a record, the edge site 106a with the first prefix and the container 108. The service 110 may store the record on the cloud-computing system 100.

The service 110 may periodically obtain and store information regarding containers (such as the container 108) operating on the edge sites 106. The service 110 may obtain the information at defined time intervals (such as every five minutes or every 30 seconds). The service 110 may obtain and store the GUI for the container 108. The service 110 may obtain and store information regarding the prefix the container 108 supports. The service 110 may obtain and store information regarding a prefix-connection location for the prefix that the container 108 supports. The prefix-connection location may be a location where traffic from the prefix enters the cloud-computing system 100. For example, assume the client device 112 accesses the network 114a through a client prefix. Assume that traffic from the client prefix is routed through the network 114b to the edge site

106a. The prefix-connection location for the client prefix may be the edge site 106a. The service 110 may associate the GUI of the container 108 and the prefix the container 108 supports. The service 110 may also associate the prefix-connection location of the prefix associated with the container 108 with the GUI of the container 108 and the prefix. The service 110 may obtain and store information about a container location of the container 108. The service 110 may associate the container location (such as the edge site 106a) with the GUI of the container 108.

The service 110 may use information the service 110 obtains regarding containers and prefixes to automatically determine whether to modify container locations for containers hosted on the cloud-computing system 100. The service 110 may use the information the service 110 obtains to automatically determine how to modify the container locations. The service 110 may automatically determine how to modify the container locations based on the information the service 110 obtains.

For example, the service 110 may compare current information regarding containers operating on the edge sites 106 with past information regarding containers operating on the edge sites 106. The service 110 may, based on the comparison, automatically modify a location of one or more containers operating in the cloud-computing system 100. The service 110 may automatically modify the location of the one or more containers to reduce latency experienced by one or more users. The service 110 may automatically modify the location of the one or more containers such that the one or more containers are closer to where traffic from prefixes supported by the one or more containers enters the cloud-computing system 100 than the containers are currently. In this context, a first location may be closer to a second location than to a third location if data travels a shorter distance to go from the first location to the second location than from the first location to the third location. The service 110 may automatically migrate the one or more containers to an edge site of the cloud-computing system 100 where the traffic supported by the one or more containers enters the cloud-computing system 100.

Consider the following example. At time to the service 110 obtains and stores information regarding the container 108. The container 108 has a GUI of "4172ee21-fc66-44d8-be64-4c6b4db86870." The container 108 supports a prefix "50.1.1.0/24." The prefix 50.1.1.0/24 has a prefix-connection location of the edge site 106a. The service 110 stores and associates the GUI, the prefix, and the prefix-connection location as (4172ee21-fc66-44d8-be64-4c6b4db86870, 50.1.1.0/24, the edge site 106a). Now assume at time $t_1$, which is some period after time to, the service 110 again obtains information regarding the container 108. The container 108 has the GUI of 4172ee21-fc66-44d8-be64-4c6b4db86870 and supports the prefix 50.1.1.0/24. But the prefix-connection location of the prefix 50.1.1.0/24 is now edge site 106b. The service 110 may observe that the prefix-connection location for the container 108 and the prefix 50.1.1.0/24 at time to is different from the prefix-connection location at time $t_1$. The service 110 may, in response to that observation, determine to modify a container location of the container 108. The service 110 may, based on that observation, migrate the container 108 to the prefix-connection location at time $t_1$, which is the edge site 106b.

In the above example, moving the container 108 from the edge site 106a to the edge site 106b may reduce latency experienced by a user accessing dynamic content housed in the container 108. The following example illustrates this point. A user is located in Los Angeles, Calif., USA. The user uses the client device 112 to play an interactive game hosted on the cloud-computing system 100. The edge site 106a hosts the interactive game (or at least some portion of the interactive game) for the user in the container 108. The user connects to the network 114a through the connection 116a to play the interactive game. Traffic from the client device 112 travels through the connection 116b, the network 114b, and the connection 116d to the edge site 106a. The edge site 106a is located within 100 miles of the user. After the user has been playing the interactive game for a period of time while experiencing low latency, the network 114b stops carrying traffic from the network 114a to the edge site 106a. At that time, traffic from the network 114a begins travelling through the network 114c to the edge site 106b. The edge site 106b is 500 miles from the user. Moreover, the edge site 106b communicates with the edge site 106a through the data center 102. The data center 102 is located 1,000 miles from the edge site 106a and the edge site 106b. Even though the container 108 is still within 100 miles of the client device 112, communications from the client device 112 may have to travel more than 2,500 miles to reach the container 108. As a result, the user may experience significantly higher latency while playing the interactive game. Moving the container 108 to the edge site 106b means that communications from the client device 112 to the container 108 have to travel only 500 miles (instead of 2,500). That may reduce the latency the user experiences in playing the interactive game.

Figure 2:
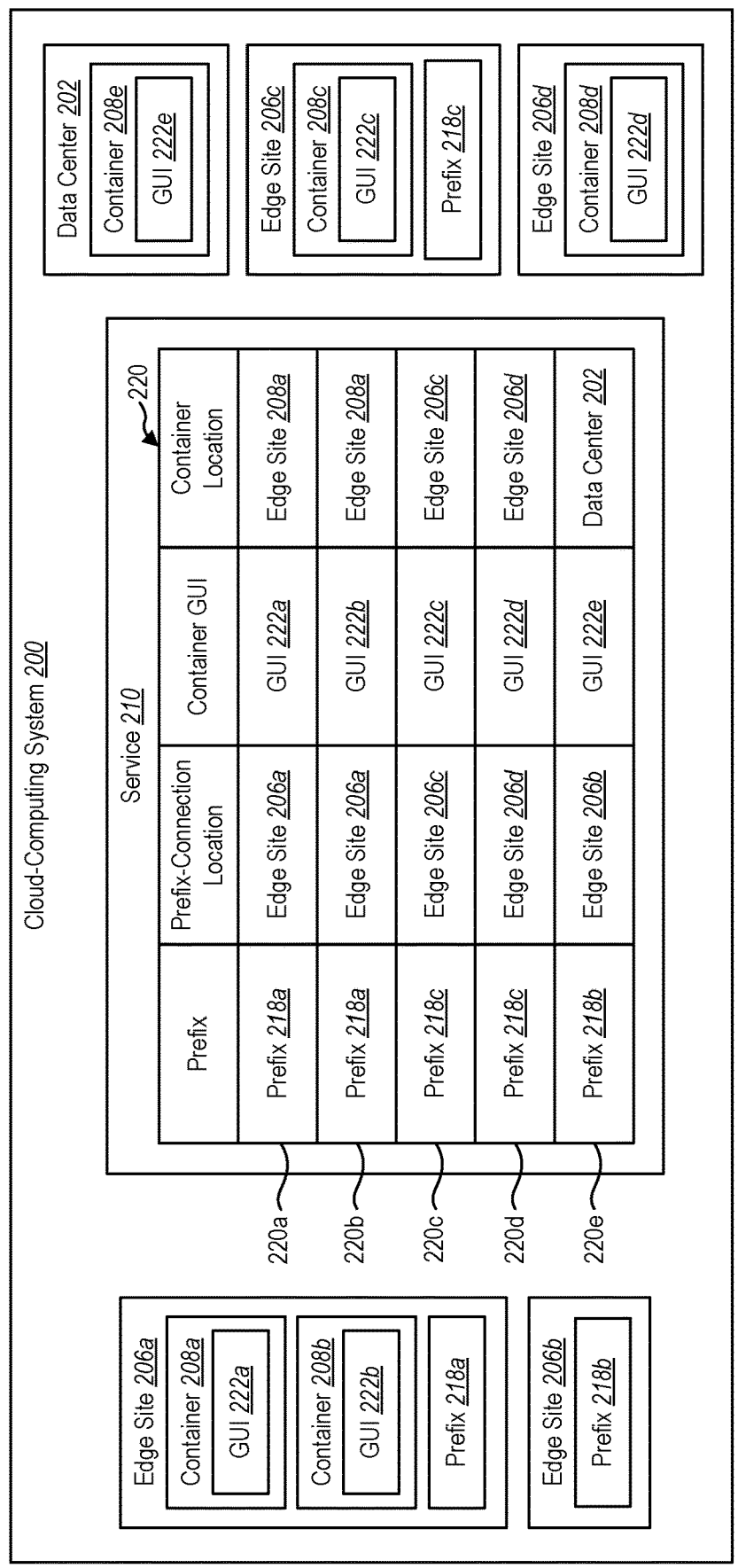
FIG. 2 illustrates an example service for minimizing latency experienced by client devices accessing a cloud-computing system.

FIG. 2 illustrates an example of a service 210 within a cloud-computing system 200.

The cloud-computing system 200 may provide services to client devices. The cloud-computing system 200 may provide services to the client devices on behalf of third-party content providers. To send data to the cloud-computing system 200 the client devices may connect to one or more networks external to the cloud-computing system 200. The networks may announce prefixes that represent the client devices.

Traffic from the prefixes may enter the cloud-computing system 200 at an edge site of the cloud-computing system 200. The cloud-computing system 200 may include multiple edge sites. For example, the cloud-computing system 200 may include edge site 206a, edge site 206b, edge site 206c, and edge site 206d. Traffic from prefix 218a may enter the cloud-computing system 200 at the edge site 206a. Traffic from prefix 218b may enter the cloud-computing system 200 at the edge site 206b. Traffic from prefix 218c may enter the cloud-computing system 200 at the edge site 206c. The cloud-computing system 200 may also include data center 202.

The cloud-computing system 200 may provide services using containers. The cloud-computing system 200 may host containers at different locations within the cloud-computing system 200. The data center 202 may host container 208e, the edge site 206a may host container 208a and container 208b, the edge site 206c may host container 208c, and the edge site 206d may host container 208d. A container may provide services to a user associated with a prefix. For example, the container 208a may provide services to a first user accessing the cloud-computing system 200 from the prefix 218a. The container 208b may provide services to a second user accessing the cloud-computing system 100 from the prefix 218a. The container 208c may provide services to a third user accessing the cloud-computing system 200 from the prefix 218c. The container 208d may provide services to a fourth user accessing the cloud-computing system 200 from the prefix 218c. The container 208e may provide services to a fifth user accessing the cloud-computing system 200 from the prefix 218b.

The service 210 may obtain and store information regarding the containers 208 operating on the cloud-computing system 200. The service 210 may obtain information regarding the containers 208 from the edge sites 206 and the data center 202. The service 210 may create and store a record 220 with the information regarding the containers. For example, the service 210 may obtain information regarding the container 208a. The service 210 may obtain a GUI 222a for the container 208a. The service 210 may determine that the container 208a is supporting the prefix 218a. The service 210 may determine that the prefix 218a is accessing the cloud-computing system 200 at the edge site 206a. The service 210 may associate the GUI 222a, the prefix 218a, and the edge site 206a in entry 220a of the record 220. The service 210 may also determine a container location for the container 208a and include the container location in the entry 220a.

Similarly, the service 210 may obtain information regarding the container 208b. The service 210 may obtain a GUI 222b for the container 208b. The service 210 may determine that the container 208b is supporting the prefix 218a. The service 210 may determine that the prefix 218a is accessing the cloud-computing system 200 at the edge site 206a. The service 210 may associate the GUI 222b, the prefix 218a, and the edge site 206a in entry 220b of the record 220. The service may also determine a container location for the container 208b and include the container location in the entry 220b.

Similarly, the service 210 may obtain information regarding the container 208c. The service 210 may obtain a GUI 222c for the container 208c. The service 210 may determine that the container 208c is supporting the prefix 218c. The service 210 may determine that the prefix 218c is accessing the cloud-computing system 200 at the edge site 206c. The service 210 may associate the GUI 222c, the prefix 218c, and the edge site 206c in entry 220c of the record 220. The service may also determine a container location for the container 208c and include the container location in the entry 220c.

Similarly, the service 210 may obtain information regarding the container 208d. The service 210 may obtain a GUI 222d for the container 208d. The service 210 may determine that the container 208d is supporting the prefix 218c. The service 210 may determine that the prefix 218c is accessing the cloud-computing system 200 at the edge site 206c. The service 210 may associate the GUI 222d, the prefix 218c, and the edge site 206c in entry 220d of the record 220. The service may also determine a container location for the container 208d and include the container location in the entry 220d.

Similarly, the service 210 may obtain information regarding the container 208e. The service 210 may obtain a GUI 222e for the container 208e. The service 210 may determine that the container 208e is supporting the prefix 218b. The service 210 may determine that the prefix 218b is accessing the cloud-computing system 200 at the edge site 206b. The service 210 may associate the GUI 222e, the prefix 218b, and the edge site 206b in entry 220e of the record 220. The service may also determine a container location for the container 208e and include the container location in the entry 220e.

The service 210 may use the information the service 210 obtains regarding the containers to determine whether to modify a location of the containers 208 hosted on the cloud-computing system 200. The service 210 may modify the location of the containers 208 based on the information. The service 210 may determine a new location for the containers 208 based on the information. The service 210 may migrate one or more of the containers 208 to new locations in order to reduce latency experienced by users. The service 210 may migrate one or more of the containers 208 to new locations closer to where traffic from the prefixes supported by the containers enter the cloud-computing system 200. The service 210 may migrate one or more of the containers 208 to edge sites where the traffic from the prefixes supported by the containers enters the cloud-computing system 200.

In determining whether to modify the location of the containers 208, the service 210 may compare current prefix-connection locations associated with the containers 208a, 208b, 208c, 208d, 208e to previous prefix-connection locations associated with the containers 208a, 208b, 208c, 208d, 208e. The service 210 may determine to modify the location of a container if the current prefix-connection location associated with the container is different from the previous prefix-connection location associated with the container. In that case, the service 210 may migrate the container to a location closer to the current prefix-connection location, such as the current prefix-connection location. For example, assume the prefix 218b (which is associated with the container 208e) has a previous prefix-connection location of the data center 202. The current prefix-connection location of the prefix 218b is the edge site 206b. The service 210 may observe that the previous prefix-connection location of the prefix 218b is different from the current prefix-connection location of the prefix 218b. In response to that observation, the service 210 may move the container 208e to the current prefix-connection location of the prefix 218b.

In determining whether to modify the location of the containers 208, the service 210 may determine whether a first distance between the current prefix-connection locations associated with the containers 208 and the container locations of the containers is greater than a second distance between the previous prefix-connection locations associated with the containers 208 and the container locations of the containers. The distance at issue may be a measure of a distance a signal must travel. In the alternative, the distance may be a measure of time (such as an average time) it takes signals to travel from one location to another. The service 210 may determine to modify a container location if the first distance is greater than the second distance. In that case, the service 210 may migrate the container to a location closer to the current prefix-connection location, such as the current prefix-connection location.

In determining whether to modify the location of the containers 208, the service 210 may compare the prefix-connection location associated with the containers 208a, 208b, 208c, 208d, 208e with the container locations associated with the containers 208a, 208b, 208c, 208d, 208e. The service 210 may determine to modify the location of a container if the prefix-connection location associated with the container is different from the container location. In that case, the service 210 may migrate the container to a location closer to the prefix-connection location, such as the prefix-connection location. For example, the container 208d supports the prefix 218c. The container location of the container 208d is the edge site 206d. But the prefix-connection location of the prefix 218c is the edge site 206c. The service 210 may observe that the container location of the container 208d is different from the prefix-connection location of the prefix 218c. In response to that observation, the service 210 may move the container 208d to the edge site 206c.

Figure 3:
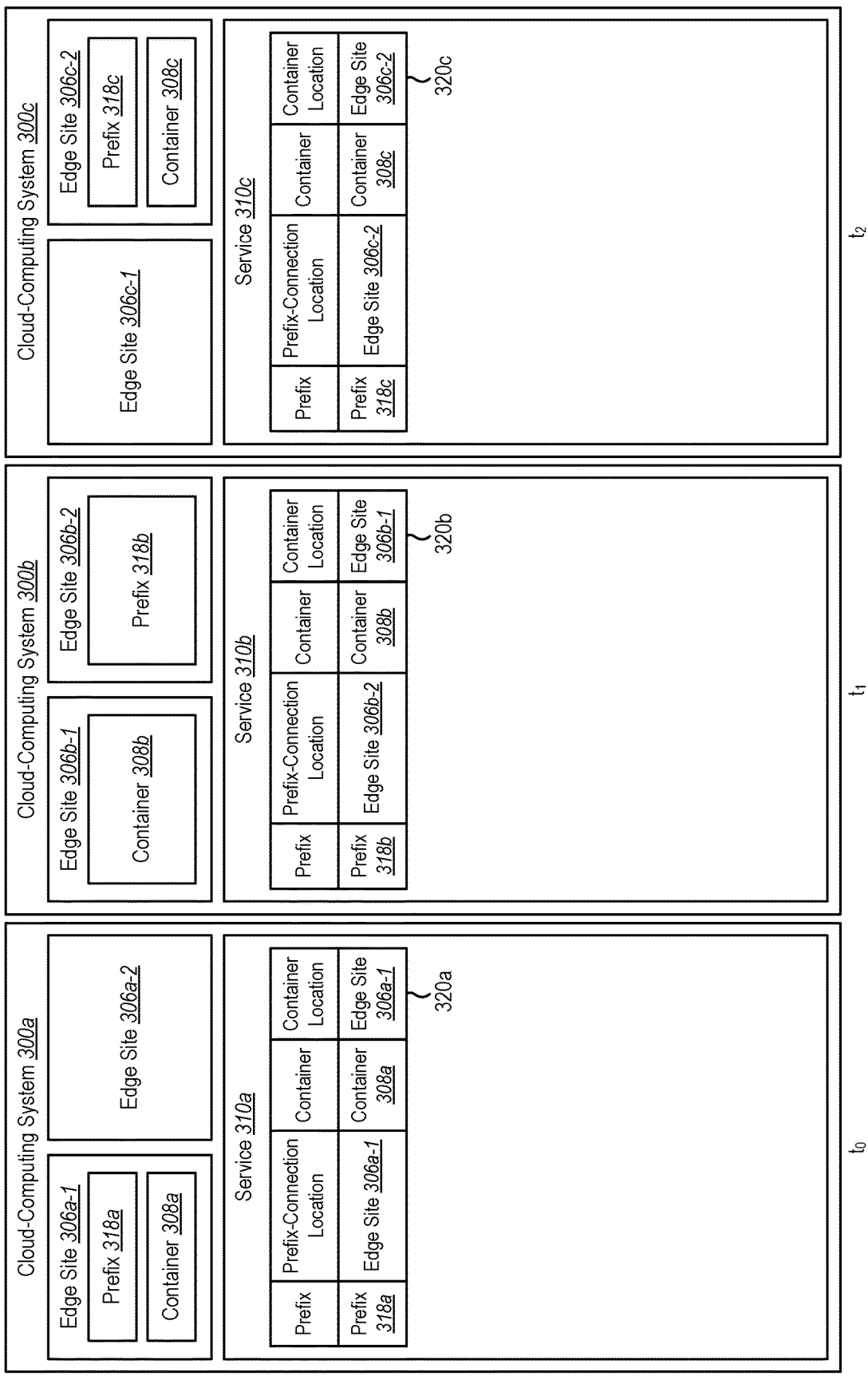
FIG. 3 illustrates an example of a cloud-computing system migrating a container based on changes to a prefix-connection location.

FIG. 3 illustrates an example timeline showing changes in a cloud-computing system. FIG. 3 illustrates the cloud computing system at three different points in time: to (shown as cloud-computing system 300a), $t_1$ (shown as cloud-computing system 300b), and $t_2$ (shown as cloud-computing system 300c). Time to occurs before time $t_1$, and time $t_1$, occurs before time $t_2$. The cloud-computing system 300a, the cloud-computing system 300b, and the cloud-computing system 300c (and elements included therein) are intended to represent the same cloud-computing system but at different points in time.

At time to, the cloud-computing system 300a includes edge site 306a-1 and edge site 306a-2. The cloud-computing system 300a includes service 310a. The edge site 306a-1 hosts container 308a. Prefix 318a enters the cloud-computing system 300a at the edge site 306a-1. The container 308a may provide services to a device behind the prefix 318a.

At time to, the service 310a may query the edge sites 306a-1, 306a-2 for information regarding containers hosted on the edge sites 306a-1, 306a-2. The service 310a may query the edge site 306a-1 to provide information regarding any containers hosted on the edge site 306a-1. The edge site 306a-1 may identify the container 308a. For example, the edge site 306a-1 may identify the container 308a using a GUI of the container 308a. The edge site 306a-1 may indicate that the container 308a provides services to the prefix 318a. The edge site 306a-1 may indicate that the prefix 318a is communicating with the edge site 306a-1. The service 310a may store information identifying the container 308a, the prefix 318a, a prefix-connection location for the prefix 318a (the edge site 306a-1), and a container location of the container 308a (the edge site 306a-1) as a record 320a.

At time $t_1$, the cloud-computing system 300b includes edge site 306b-1 and edge site 306b-2. The cloud-computing system 300b includes service 310b. The edge site 306b-1 still hosts container 308b. But prefix 318b now enters the cloud-computing system 300b at the edge site 306b-2. The container 308b may still provide services to a device behind the prefix 318b.

At time $t_1$, the service 310b may again query the edge sites 306b-1, 306b-2 for information regarding containers hosted on the edge sites 306b-1, 306b-2. The service 310b may query the edge site 306b-1 to provide information regarding any containers hosted on the edge site 306b-1. The edge site 306b-1 may identify the container 308b. For example, the edge site 306b-1 may identify the container 308b using a GUI of the container 308b. The edge site 306b-1 may indicate that the container 308b provides services to the prefix 318b. The edge site 306b-1 may not, however, have information regarding where traffic from the prefix 318a enters the cloud-computing system 300b. The service 310b may learn that traffic from the prefix 318b enters the cloud-computing system 300b through the edge site 306b-2 when the service 310b queries the edge site 306b-2. The service 310b may store information identifying the container 308b, the prefix 318b, a prefix-connection location for the prefix 318b (the edge site 306b-2), and a container location of the container 308b (the edge site 306b-1) as a record 320b.

The service 310b may detect whether the prefix-connection location associated with the container 308b has changed. The service 310b may compare the prefix-connection location in the record 320b with the prefix-connection location in the record 320a. The service 310b may determine that the prefix-connection location shown in the record 320b is different from the prefix-connection location shown in the record 320a.

The service 310b may determine whether to modify a location of the container 308b based on whether the service 310b detected that the prefix-connection location associated with the container 308b has changed. The service 310b may determine to modify the location if the prefix-connection location has changed. In response to detecting a change, the service 310b may determine to move the container 308b from the edge site 306b-1 to the edge site 306b-2.

In the alternative, the service 310b may determine whether to modify a location of the container 308b based on whether the container location of the container 308b in the record 320b is different from the prefix-connection location shown in the record 320b. The service 310b may compare the container location of the container 308b in the record 320b with the prefix-connection location shown in the record 320b. The service 310b may determine to modify the location of the container 308b if the prefix-connection location shown in the record 320b is different from the container location shown in the record 320b. In response to that observation, the service 310b may determine to move the container 308b from the edge site 306b-1 to the edge site 306b-2.

At time $t_2$, the cloud-computing system 300c includes edge site 306c-1 and edge site 306c-2. The cloud-computing system 300c includes service 310c. The edge site 306c-1 no longer hosts container 308c. Instead, the edge site 306c-2 hosts the container 308c. Prefix 318c enters the cloud-computing system 300c at the edge site 306c-2. The container 308c still provides services to a device behind the prefix 318c.

At time $t_2$, the service 310c may again query the edge sites 306c-1, 306c-2 for information regarding containers hosted on the edge sites 306c-1, 306c-2. The service 310c may query the edge site 306c-1 to provide information regarding any containers hosted on the edge site 306c-1. The edge site 306c-1 may respond that it is not hosting any containers. In contrast, the edge site 306c-2 may indicate that it hosts the container 308c and provide information identifying the container 308c, such as a GUI for the container 308c. The edge site 306c-2 may also indicate that the container 308c provides services to the prefix 318c. The edge site 306c-2 may indicate that traffic from the prefix 318c enters the cloud-computing system 300c through the edge site 306c-2. The service 310c may store the information identifying the container 308c, the prefix 318c, a prefix-connection location for the prefix 318c (the edge site 306c-2), and a container location of the container 308c (the edge site 306c-2) as a record 320c.

The service 310c may determine whether to move the container 308c. The service 310c may compare the prefix-connection location associated with the container 308c with the prefix-connection location associated with the container 308b. The service 310c may compare the prefix-connection location shown in the record 320c with the prefix-connection location shown in the record 320b. The service 310c may determine that the prefix-connection location shown in the record 320c is identical to the prefix-connection location shown in the record 320b. In response to that observation, the service 310c may determine to not move the container 308c.

In the alternative, the service 310c may compare the container location of the container 308c in the record 320c with the prefix-connection location shown in the record 320c. The service 310c may determine that the prefix-connection location shown in the record 320c is identical to the container location shown in the record 320c. In response to that observation, the service may determine to not move the container 308c.

Figure 4:
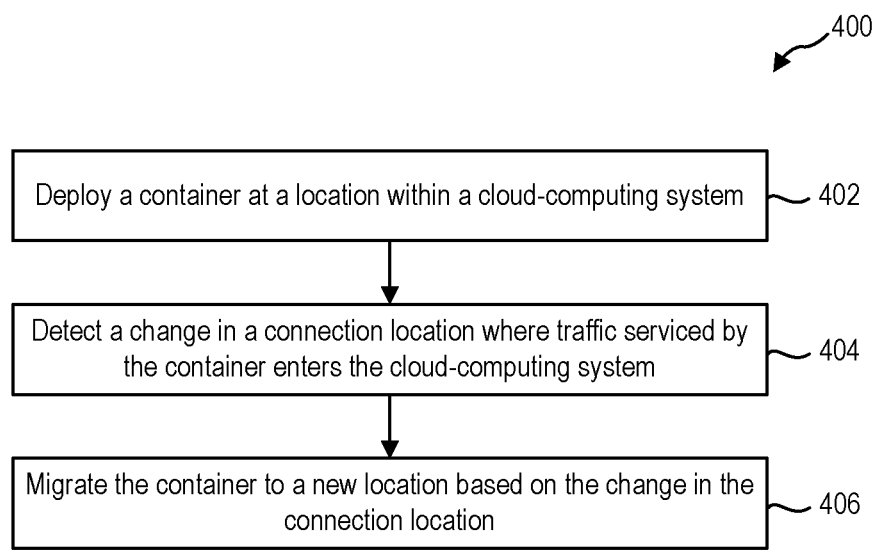
FIG. 4 illustrates an example method for migrating a container to a new location within a cloud-computing system.

FIG. 4 illustrates an example method 400 for migrating containers in a cloud-computing system.

The method 400 may include deploying 402 a container at a location within a cloud-computing system. The container may be deployed at a data center within the cloud-computing system. The container may be deployed at an edge site within the cloud-computing system. The container may be deployed at a server near the edge site and outside the data center. The container may be deployed to provide services or content to a particular user.

The location may be deployed at a location that minimizes latency experienced by the user. The location may be based on where the user is located. The location may be based on where traffic from the user enters the cloud-computing system. The location may be where the traffic from the user enters the cloud-computing system. For example, if the traffic from the user enters the cloud-computing system at an edge site, the location may be the edge site. In the alternative, the location may be near where the traffic from the user enters the cloud-computing system. For example, the traffic from the user may enter the cloud-computing system at an edge site. But the edge site may not have capacity for the container. In that case, the container may be placed at a location near the edge site that has capacity.

The method 400 may include detecting 404 a change in a connection location where traffic serviced by the container enters the cloud-computing system. Detecting 404 the change in the connection location where the traffic serviced by the container enters the cloud-computing system may include detecting, at a first time, that the traffic enters the cloud-computing system at a first location and detecting, at a second time, that the traffic enters the cloud-computing system at a second location different from the first location. The first location and the second location may be edge sites within the cloud-computing system. Detecting, at the first time, that the traffic enters the cloud-computing system at the first location may include querying the first location and receiving, from the first location, information indicating that the first location receives the traffic. Detecting, at the second time, that the traffic enters the cloud-computing system at the second location may include querying the first location, querying the second location, and receiving, from the second location, information indicating that the second location receives the traffic.

The method 400 may include migrating 406 the container to a new location based on the change in the connection location. The new location may be within the cloud-computing system. The new location may be where the traffic serviced by the container enters the cloud-computing system after the change in the connection location. The new location may be a location near where the traffic serviced by the container enters the cloud-computing system. The new location may be a location closer to where the traffic serviced by the container enters the cloud-computing system than a previous location of the container. The new location may be based on minimizing latency experienced by the user.

Figure 5:
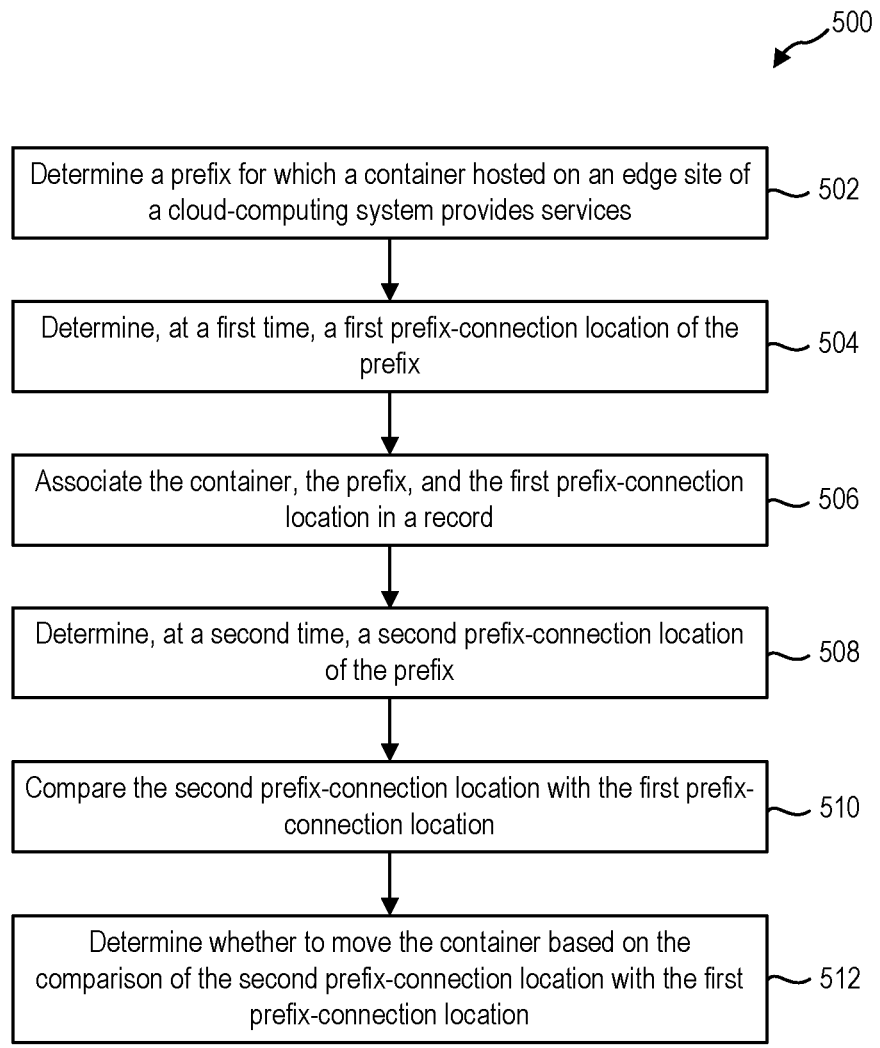
FIG. 5 illustrates an example method for determining whether to move a container hosted within a cloud-computing system.

FIG. 5 illustrates an example method 500 for determining whether to modify a location of a container in a cloud-computing system.

The method 500 may include determining 502 a prefix for which a container hosted on an edge site of a cloud-computing system provides services. Determining 502 the prefix may include querying the edge site and receiving, from the edge site, information indicating the prefix for which the container provides services. A service hosted in the cloud-computing system may query the edge site. The service may query the edge site at predetermined intervals. The service may query the edge site at non-fixed, variable intervals. The service may query the edge site in response to user feedback, such as complaints about latency and performance.

The method 500 may include determining 504, at a first time, a first prefix-connection location of the prefix. The first prefix-connection location of the prefix may be a location within the cloud-computing system where traffic from the prefix enters the cloud-computing system at the first time. Determining 504 the first prefix-connection location may include querying the edge site and receiving, from the edge site, information that traffic from the prefix enters the cloud-computing system at the edge site. The first prefix-connection location may be the edge site that hosts the container.

The method 500 may include associating 506 the container, the prefix, and the first prefix-connection location in a record. Associating 506 the container may include associating a GUI of the container. Associating 506 may include storing the record within the cloud-computing system.

The method 500 may include determining 508, at a second time, a second prefix-connection location of the prefix. The second prefix-connection location of the prefix may be a location within the cloud-computing system where traffic from the prefix enters the cloud-computing system at the second time. Determining 508 the second prefix-connection location may include querying the edge site and receiving, from the edge site, information that traffic from the prefix enters the cloud-computing system at the edge site. In the alternative, determining 508 the second prefix-connection location may include querying a second edge site and receiving, from the edge site, information that traffic from the prefix enters the cloud-computing system at the second edge site. The cloud-computing system may include a data center and the first prefix-connection location and the second prefix-connection location may not be included in the data center.

The method 500 may include comparing 510, the second prefix-connection location with the first prefix-connection location. Comparing 510 the second prefix-connection location with the first prefix-connection location may include determining that the second prefix-connection location is different from the first prefix-connection location. In the alternative, comparing 510 the second prefix-connection location with the first prefix-connection location may include determining that the second prefix-connection location is identical to the first prefix-connection location.

The method 500 may include determining 512 whether to move the container based on the comparison of the second prefix-connection location with the first prefix-connection location.

Determining 512 whether to move the container may include determining to move the container when the second prefix-connection location is different from the first prefix-connection location. In that case, the method 500 may further include migrating the container to the second prefix-connection location or a location within the cloud-computing system closer to the second prefix-connection location than the edge site.

Determining 512 whether to move the container may include determining to not move the container when the second prefix-connection location is identical to the first prefix-connection location. In that case, the method 500 may further include maintaining the container at the edge site.

Figure 6:
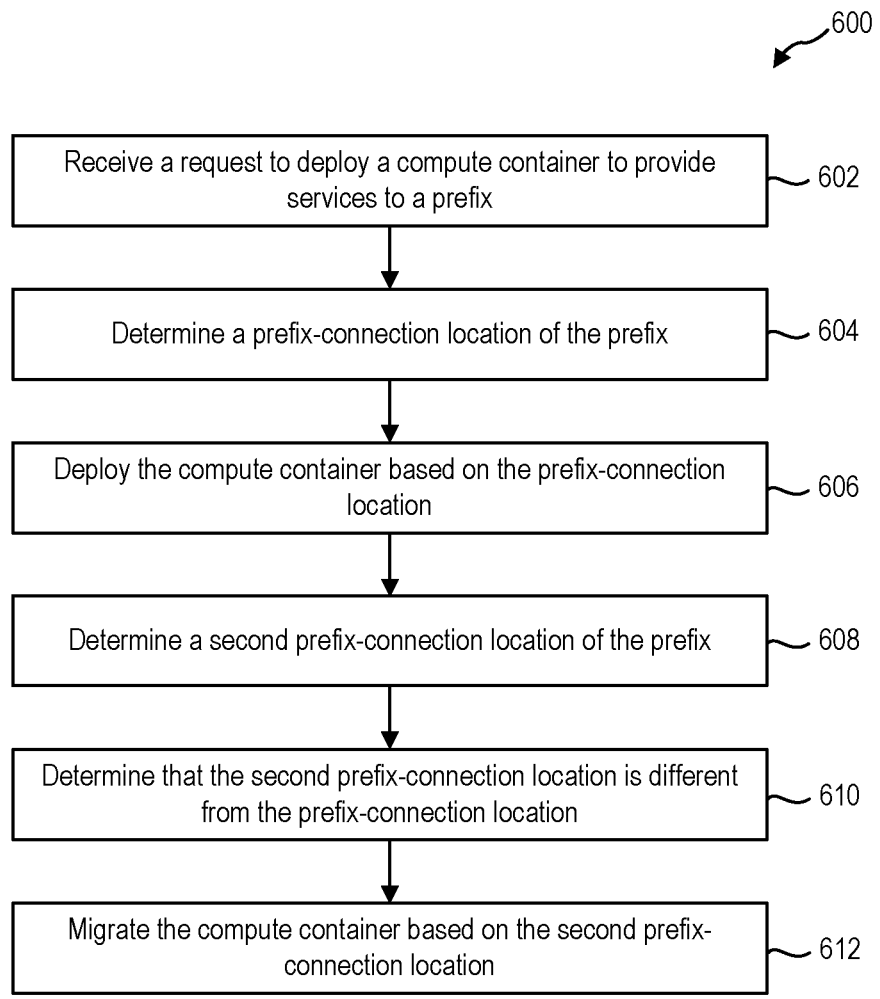
FIG. 6 illustrates an example method for migrating a compute container based on a prefix-connection location.

FIG. 6 illustrates an example method 600 for migrating a container in a cloud-computing system.

The method 600 may include receiving 602 a request to deploy a compute container to provide services to a prefix. A user behind the prefix may request services from a cloud-computing system. The user's request for services may be the request to deploy the compute container. The compute container may provide services to the user.

The method 600 may include determining 604 a prefix-connection location of the prefix. The prefix-connection location of the prefix may be a location within the cloud-computing system where traffic from the prefix enters the cloud-computing system. The prefix-connection location may be an edge site of the cloud-computing system. The prefix-connection location may be an edge site near the user. The prefix-connection location may be an edge site far from the user. The prefix-connection location may be a data center within the cloud-computing system. Determining 604 the prefix-connection location of the prefix may occur at a first time.

The method 600 may include deploying 606 the compute container based on the prefix-connection location. Deploying 606 the compute container based on the prefix-connection location may include deploying the compute container at the prefix-connection location. The cloud-computing system may deploy the compute container to minimize latency experienced by the user.

The method 600 may include determining 608 a second prefix-connection location of the prefix. The second prefix-connection location of the prefix may be a location within the cloud-computing system where traffic from the prefix enters the cloud-computing system. The second prefix-connection location may be an edge site of the cloud-computing system. Determining 604 the second prefix-connection location of the prefix may occur at a second time after the first time.

The method 600 may include determining 610 that the second prefix-connection location is different from the prefix-connection location.

The method 600 may include migrating 612 the compute container based on the second prefix-connection location. Migrating 612 the compute container based on the second prefix-connection location may include migrating the compute container to the second prefix-connection location. The cloud-computing system may migrate the compute container to minimize latency experienced by the user.

Figure 7:
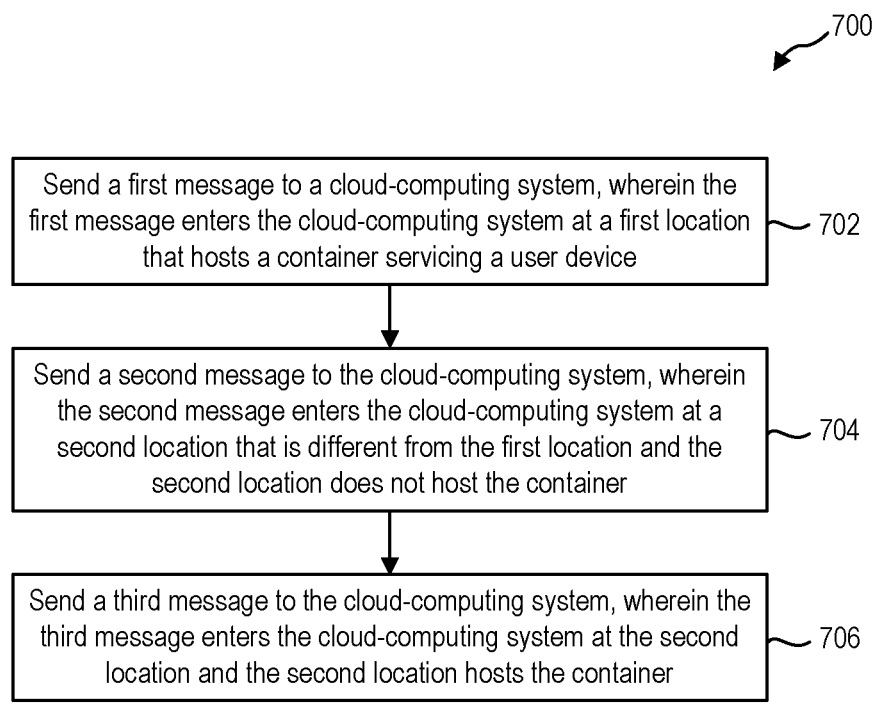
FIG. 7 illustrates an example method for sending messages to a cloud-computing system.

FIG. 7 illustrates an example method 700 for sending messages to a cloud-computing system.

The method 700 may include sending 702 a first message to a cloud-computing system, wherein the first message enters the cloud-computing system at a first location that hosts a container servicing a user device. The user device may send 702 the first message to the cloud-computing system.

The method 700 may include sending 704 a second message to the cloud-computing system, wherein the second message enters the cloud-computing system at a second location that is different from the first location and the second location does not host the container. The user device may send 704 the second message to the cloud-computing system.

The method 700 may include sending 706 a third message to the cloud-computing system, wherein the third message enters the cloud-computing system at the second location and the second location hosts the container. The user device may send 706 the third message to the cloud-computing system. The second message may take longer to reach the first location than the third message takes to reach the second location.

Figure 8:
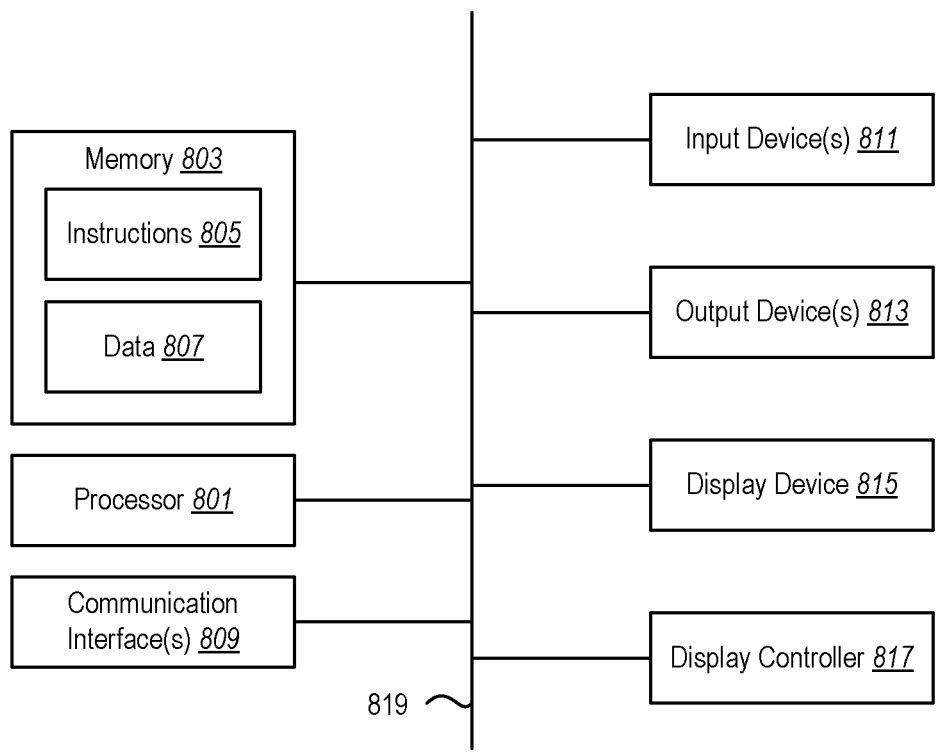
FIG. 8 illustrates certain components that may be included in a computing system.

FIG. 8 illustrates certain components that may be included within a computer system 800. One or more computer systems 800 may be used to implement the various devices, components, and systems described herein.

The computer system 800 includes a processor 801. The processor 801 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein. Executing the instructions 805 may involve the use of the data 807 that is stored in the memory 803. Any of the various examples of modules, components, packages, applications, and operating systems described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

As used in the present disclosure, a "cloud-computing system" may refer to a network of connected computing devices that provide various services to client devices. For example, a distributed computing system may include a collection of physical server devices (such as server nodes) organized in a hierarchical structure. Such a hierarchical structure may include computing zones, clusters, virtual local area networks (VLANs), racks, fault domains, etc. One or more specific examples and implementations described herein may relate specifically to "data centers" that include multiple server nodes. But the features and functionality described in connection with one or more node data centers may similarly relate to racks, fault domains, or other hierarchical structures of physical server devices. The cloud computing system may refer to a private or public cloud computing system.

As used in the present disclosure, a "computing container," "virtual container," "compute container," or "container" may refer to a virtual service or layer on a server node of a cloud computing system that provides access to computing resources (such as a storage space) and/or a software application hosted by the cloud-computing system. Computing containers may provide services to any number of containerized applications on a cloud-computing system. As used in the present disclosure, a "virtual service" or a "service" may refer to a service provided by a cloud-computing system.

A "virtual machine" may refer to an emulation of a computer system on a server node that provides functionality of one or more applications on the cloud computing system. Virtual machines may provide functionality needed to execute one or more operating systems. In addition, virtual machines may make use of hypervisors on processors of server devices that support virtual replication of hardware. While one or more specific examples and implementations described herein may relate specifically to virtual machines, features and functionality described in connection with utilizing resources on a server node may similarly apply to other types of computing containers.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method comprising:
   receiving, at a first time at a service of a cloud-computing system and in response to a first query of the service, information indicating that a border gateway protocol (BGP) prefix enters the cloud-computing system at a first location, wherein the first location is a first prefix-connection location of the BGP prefix;
   receiving, at the service from the first location, an identifier of a container that supports the BGP prefix;
   associating the identifier, the BGP prefix, and the first prefix-connection location;
   receiving, at the service at a second time after the first time and in response to a second query, information indicating the BGP prefix enters the cloud-computing system at a second location of the cloud-computing system, wherein the second location is a second prefix-connection location of the BGP prefix;

comparing, at the service, the second prefix-connection location with the first prefix-connection location; and determining, at the service, whether to move the container based on the comparison.

2. The method of claim 1, wherein the container is hosted at the first prefix-connection location.

3. The method of claim 2 further comprising:
determining that the second prefix-connection location is different from the first prefix-connection location.

4. The method of claim 3 further comprising:
determining to move the container based on the second prefix-connection location being different from the first prefix-connection location; and
migrating the container from the first prefix-connection location to the second prefix-connection location.

5. The method of claim 2 further comprising:
determining that the second prefix-connection location is identical to the first prefix-connection location.

6. The method of claim 5 further comprising:
determining to not move the container based on the second prefix-connection location being identical to the first prefix-connection location; and
maintaining the container at the first prefix-connection location.

7. The method of claim 1 further comprising:
associating the BGP prefix, the first prefix-connection location, and the identifier of the container in a record; and
storing the record.

8. The method of claim 1, wherein the first prefix-connection location and the second prefix-connection location are edge sites of the cloud-computing system.

9. The method of claim 1, wherein the cloud-computing system comprises a data center and the first prefix-connection location and the second prefix-connection location are not included in the data center.

10. A method comprising:
sending, from a user device, a first message to a cloud-computing system, wherein the first message travels through a first network path comprising two or more networks and enters the cloud-computing system at a first location, wherein the first location hosts a container servicing the user device and the first location receives a border gateway protocol (BGP) prefix associated with the user device and provides the BGP prefix to a service of the cloud-computing system in response to a query of the service;

sending, from the user device, a second message to the cloud-computing system, wherein the second message travels through a second network path different from the first network path and enters the cloud-computing system at a second location different from the first location, wherein the first location hosts the container and the second location receives the BGP prefix associated with the user device and provides the BGP prefix to a service of the cloud-computing system in response to a query of the service; and sending, from the user device, a third message to the cloud-computing system, wherein the third message enters the cloud-computing system at the second location and the second location hosts the container.

11. The method of claim 10, wherein the second message takes longer to reach the first location than the third message takes to reach the second location.

\* \* \* \* \*